United States Patent
Wang et al.

(10) Patent No.: US 10,042,836 B1
(45) Date of Patent: Aug. 7, 2018

(54) SEMANTIC KNOWLEDGE BASE FOR TAX PREPARATION

(75) Inventors: Gang Wang, San Diego, CA (US); Igor A. Podgorny, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 181 days.

(21) Appl. No.: 13/460,561

(22) Filed: Apr. 30, 2012

(51) Int. Cl.
*G06Q 10/10* (2012.01)
*G06F 17/24* (2006.01)
*G06F 17/30* (2006.01)

(52) U.S. Cl.
CPC ...... *G06F 17/243* (2013.01); *G06F 17/30958* (2013.01); *G06Q 10/10* (2013.01)

(58) Field of Classification Search
CPC ............... G06F 17/30734; G06F 17/30731
USPC .................................... 705/31; 707/722, 771
See application file for complete search history.

(56) References Cited

U.S. PATENT DOCUMENTS

| | | | | |
|---|---|---|---|---|
| 7,752,094 B2 * | 7/2010 | Davidson | ............. | G06Q 20/207 705/31 |
| 7,822,732 B2 * | 10/2010 | Bodapati | ........... | G06F 17/30864 707/706 |
| 7,933,915 B2 * | 4/2011 | Singh | ................ | G06F 17/30958 707/760 |
| 8,019,753 B2 * | 9/2011 | Podgorny | .............. | G06Q 10/10 707/722 |
| 8,335,754 B2 * | 12/2012 | Dawson | .............. | G06F 17/2705 706/45 |
| 8,392,360 B1 * | 3/2013 | Dicker | ................... | G06Q 10/10 707/608 |
| 2001/0044795 A1 * | 11/2001 | Cohen | ............... | G06F 17/30699 |
| 2007/0033117 A1 * | 2/2007 | Murray | ................ | G06F 17/243 705/31 |
| 2008/0152238 A1 * | 6/2008 | Sarkar | ............... | G06K 9/00442 382/228 |
| 2010/0030725 A1 * | 2/2010 | Mendis | ............ | G06F 17/30958 707/781 |
| 2010/0228693 A1 * | 9/2010 | Dawson | .............. | G06F 17/2705 706/12 |
| 2012/0215810 A1 * | 8/2012 | Evans | ............... | G06F 17/30489 707/771 |

* cited by examiner

*Primary Examiner* — Talia F Crawley
(74) *Attorney, Agent, or Firm* — FBFK PC (57) ABSTRACT

A method for tax preparation, including: obtaining a tax preparation ontology and a set of electronic tax documents; mining, by a computer processor, the set of electronic tax documents to identify relevant tax data based on the tax preparation ontology; constructing, by the computer processor, a semantic graph including the relevant tax data in a set of triples; receiving a semantic query language query; querying the semantic graph based on the semantic language query to obtain a result set; and returning the result set to a tax preparation application, where the tax preparation application displays at least a portion of the result set to a user in response to a help request.

29 Claims, 7 Drawing Sheets

SEMANTIC KNOWLEDGE BASE FOR TAX PREPARATION

BACKGROUND

Semantic technologies involve the use of semantic modeling and tools to structure and provide information based on an understanding of human language and behavior. Traditional software systems are configured to obtain machine-readable commands and information as input in order to function. These systems typically deal extensively with human readable information, yet lack the capability to interpret or otherwise refine that information. This has lead to a structural dichotomy of data into machine-readable and human readable forms. This underlying framework of system design leaves users, designers, and developers with the task of translation, interpretation, and modification of human-readable data into machine-readable form, and vice-versa. Semantic technologies attempt to bridge the divide by allowing systems to interpret, modify, and/or generate human readable information.

The preparation and filing of financial returns involves complex financial calculations and relationships between various financial amounts among multiple forms. Traditional software systems are well adapted for storing, calculating, and accessing this type of relational data. Despite this, even with the aid of a tax preparation application, the process of preparing and filing a financial return can be extremely difficult for the user. This difficulty is due, at least partially, to the fact that, aside from entering financial amounts, the user is required to read and understand a series of interview-based questions presented by the application. This communication between the user and the application is substantially based on the machine-readable language of the application. In other words, the options presented to the user are static, and are based solely on the underlying requirements of the tax document, while the behavior and attributes of the user are largely ignored.

SUMMARY

In general, in one aspect, the invention relates to a method for tax preparation. The method includes: obtaining a tax preparation ontology and a set of electronic tax documents; mining, by a computer processor, the set of electronic tax documents to identify relevant tax data based on the tax preparation ontology; constructing, by the computer processor, a semantic graph including the relevant tax data in a set of triples; receiving a semantic query language query; querying the semantic graph based on the semantic language query to obtain a result set; and returning the result set to a tax preparation application, where the tax preparation application displays at least a portion of the result set to a user in response to a help request.

In general, in one aspect, the invention relates to a system for tax preparation. The system includes: a computer processor; a noSQL database storing a semantic graph including relevant tax data in a set of triples; a tax preparation engine executing on the computer processor and configured to obtain a tax preparation ontology and a set of electronic tax documents, mine the set of electronic tax documents to identify the relevant tax data based on the tax preparation ontology, construct the semantic graph and store the semantic graph in the noSQL database; and a query interface configured to receive a semantic query language query, query the semantic graph based on the semantic language query to obtain a result set, and return the result set to a tax preparation application, where the tax preparation application displays at least a portion of the result set to a user in response to a help request.

In general, in one aspect, the invention relates to a non-transitory computer-readable storage medium storing instructions for tax preparation. The instructions include functionality to: obtain a tax preparation ontology and a set of electronic tax documents; mine the set of electronic tax documents to identify relevant tax data based on the tax preparation ontology; construct a semantic graph including the relevant tax data in a set of triples; receive a semantic query language query; query the semantic graph based on the semantic language query to obtain a result set; and return the result set to a tax preparation application, where the tax preparation application displays at least a portion of the result set to a user in response to a help request.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for tax preparation. A tax preparation ontology and a set of electronic tax documents are obtained. The electronic tax documents are minted to identify relevant tax data based on the tax preparation ontology. The tax data is then used to construct a set of triples, each defining a relationship between a subject, predicate, and object. The triples are used to construct a semantic graph. After the semantic graph is constructed, a semantic query language query is received. The semantic graph is then queried based on the semantic language query and a result set is obtained. The result set is returned to a tax preparation application, wherein the application displays at least a portion of the result set to a user in response to a help request.

Figure 1A:
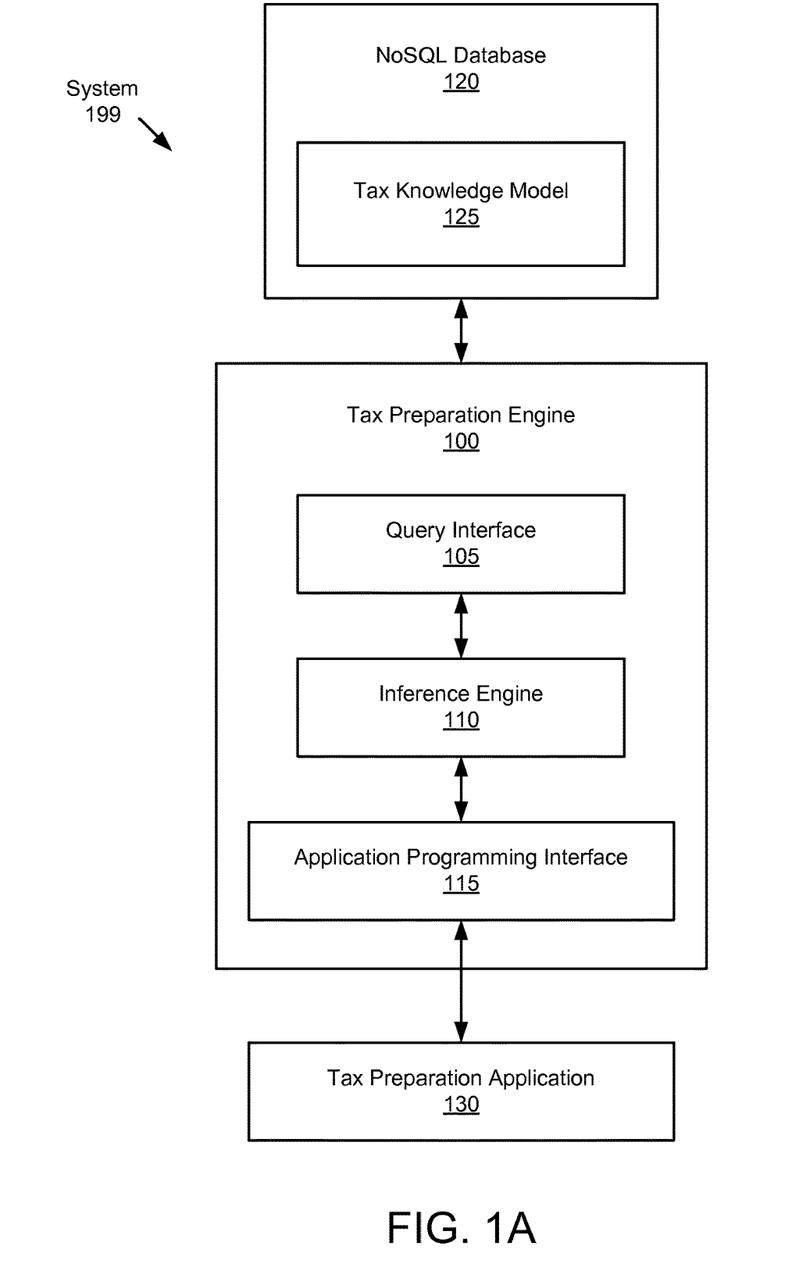
FIGS. 1A and 1B show schematic diagrams of systems in accordance with one or more embodiments of the invention.

FIG. 1A shows a system (199) in accordance with one or more embodiments of the invention. As shown in FIG. 1A, the system has multiple components including a tax preparation engine (100), a query interface (105), an inference engine (110), an application programming interface (115), a noSQL database (120), a tax knowledge model (125), and a tax preparation application (130). Various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the tax preparation engine (100) is a software application or a set of software applications executing on one or more hardware processors. The software application may be a web application in a server of a data center and/or a cloud computing application in a network distributed system. Alternatively, the tax preparation engine (100) may be a software application residing in a personal computing device (e.g., smartphone, laptop computer, desktop computer, etc.) of a user. In one or more embodiments of the invention, the tax preparation engine (100) is integrated within or operatively connected to the tax preparation application (130).

In one or more embodiments of the invention, the tax preparation engine (100) includes functionality to obtain, define, and/or modify a tax preparation ontology. A tax preparation ontology may include any formally defined set of concepts, as well as properties of and relationships between those concepts. The tax preparation ontology may be implemented using any programming language, knowledge representation language, or protocol. The tax preparation ontology may include programming constructs such as classes, subclasses, instances, data types, and/or property descriptors. Examples of domain specific concepts defined in the tax preparation ontology may include, but are not limited to, tax form, worksheet, deduction, gross income, depreciation, dependent, credit, wage, expense, charitable contribution, contractor, and/or employee. For example, the tax preparation ontology may be implemented using Web Ontology Language (OWL) on top of a resource description framework (RDF) with extended constructions. Any other protocol or language may be used, in accordance with various embodiments of the invention.

In one or more embodiments of the invention, the tax preparation ontology includes one or more triples. A triple is a data defining a relationship between at least one subject, one predicate, and one object. The subject and object may be tax-related concepts and the predicate may define a relationship between those one or more subjects and one or more objects. The following are examples of triples defined in a tax preparation ontology:

r:works_for rdfs:domain :Employer.
   r:works_for rdfs:range :Employee.
   r:employs owl:inverseOf r:works_for.
   :Employee rdfs:subClassOf :Person
   r:isSpouseOf rdfs:domain :Person.
   r:isSpouseOf rdfs:range :Person.
   r:isSpouseOf rdf:type owl: SymmetricProperty.

The triples defined by the tax preparation ontology may include the above mentioned programming constructs and may be defined by the ontology in order to create a framework for modeling the tax domain or a representation of the tax domain.

In one or more embodiments of the invention, the tax knowledge model (125) includes functionality to store one or more ontologies, triples, semantic graphs, and/or tax related data in the noSQL database (120). The tax knowledge model (125) may be a data structure, table, or any other logical collection capable of storing semantic data. In one or more embodiments of the invention, the tax knowledge model (125) includes a hierarchical concept class structure for the tax preparation ontology. The class structure may define objects, classes, and/or data types for representing one or more tax concepts (e.g., filer, form, income, worksheet, deduction, etc.). The tax knowledge model (125) may be distributed over multiple instances or nodes in a network, in accordance with various embodiments of the invention.

Figure 1B:
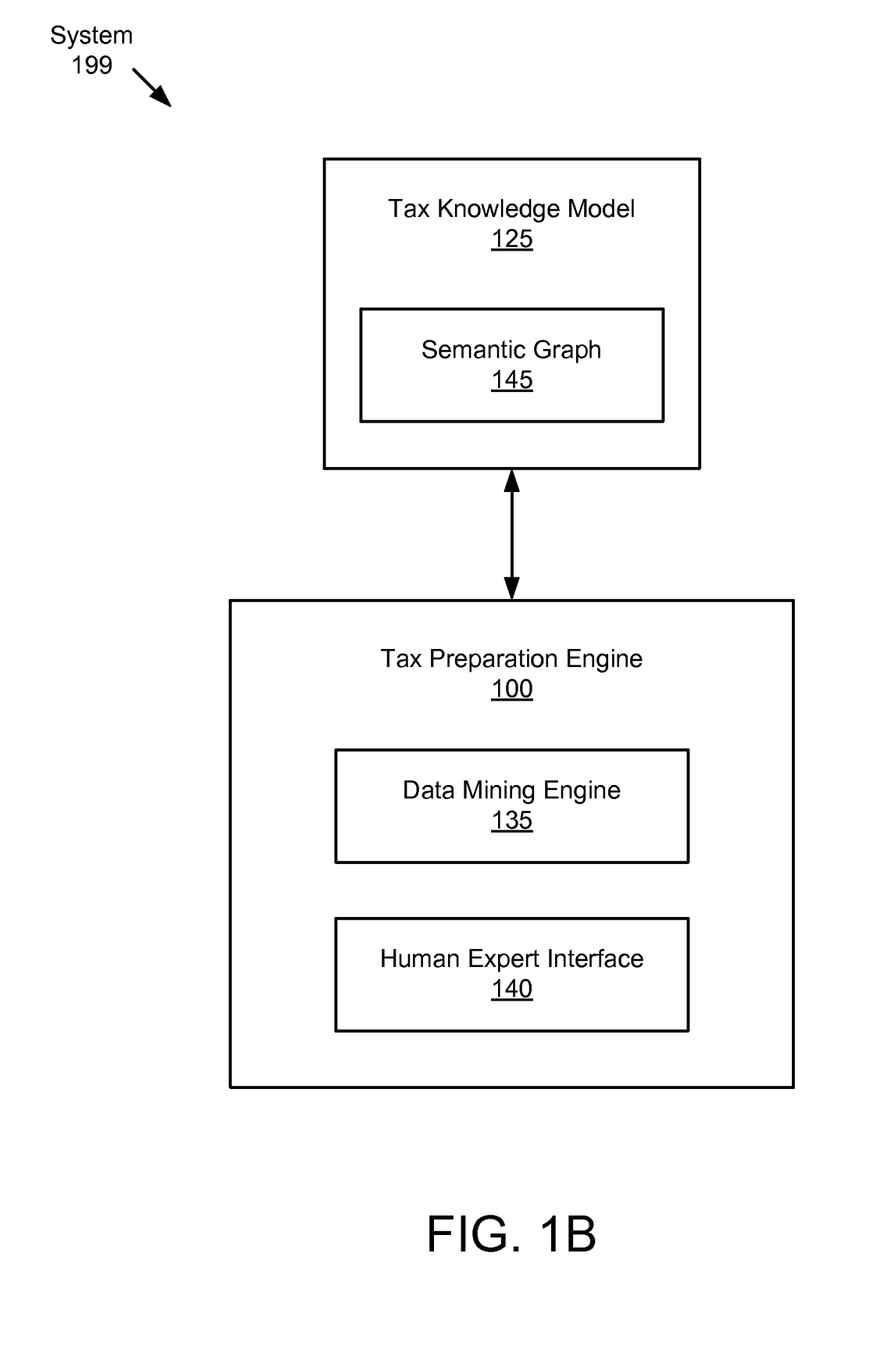

FIG. 1B shows additional optional components of the system (199) in accordance with one or more embodiments of the invention. As shown in FIG. 1B, the system may include the tax knowledge model (125), a semantic graph (145), the tax preparation engine (100), a data mining engine (135), and a human expert interface (140). Various components of the system (199) may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the human expert interface (140) is a user interface configured to display one or more options to a user and to obtain one or more selections and/or commands from the user. The human expert interface (140) may be configured to obtain a definition of a tax preparation ontology. The human expert interface (140) may also be configured to receive one or more files including the ontology and/or data to be included in an existing ontology, in one or more embodiments of the invention.

In one or more embodiments of the invention, the human expert interface (140) includes functionality to receive one or more improvements to the tax knowledge model (125) from a user. The human expert interface (140) may update relationships between subjects and objects of one or more triples, create new subjects/objects/triples, remove one or more triples, define attributes or properties of one or more tax concepts, and/or otherwise improve the tax knowledge model (125) and/or the semantic graph (145) based on an understanding of the tax domain. Thus, the human expert interface (140) may be configured to refine the tax knowledge model (125) according to user input. This refinement may be performed immediately after aggregation and formation of the data in the noSQL database (120), at one or more periodic intervals (by sending a reminder message to the user), and/or at any other time, in accordance with various embodiments of the invention. In one example, if the tax preparation engine (100) created multiple triples containing the subject "bank", the human expert interface (140) may receive instructions from a user differentiating between different uses of the word among various tax documents. In this example, the user may determine that the word bank can refer to a financial institution as well as a repository. The user may, in this example, remove some or all references to the latter type of "bank" from the semantic graph (145). In one or more embodiments of the invention, the human expert interface (140) is also configured to receive an instruction from a user to integrate the tax knowledge model (125) with one or more other ontologies, datastores, and/or data collections.

In one or more embodiments of the invention, the tax preparation engine (100) includes functionality to obtain the tax preparation ontology from a third party software application. Alternatively, in one or more embodiments of the invention, a user of the tax preparation engine may upload the tax preparation ontology using the human expert interface (140). Any number of different ontologies from different sources may be combined and/or modified to create the tax preparation ontology, in accordance with various embodiments of the invention.

In one or more embodiments of the invention, the tax preparation engine (100) includes functionality to obtain one or more tax documents. The tax document(s) may be obtained from a government agency, a user of a web application, a tax preparation application, a non-profit organization, a local/state/federal government database or website, and/or any other entity, in accordance with various embodiments of the invention. Examples of a tax document may include, but are not limited to, an Internal Revenue Service (IRS) Form 1040, a Form 1040EZ, a Form W-2, a Form W-9, a Form 1098-T, a Schedule E Form, a Schedule K Form, a Personal Allowances Worksheet, a Publication 15, a property appraisal document, a county tax assessment document, a sales and use tax reporting form, a business expense worksheet, and/or any other document related to the preparation and/or filing of a financial return.

In one or more embodiments of the invention, the human expert interface (140) includes functionality to receive one or more queries. A query may be a semantic language query written in a semantic programming language, semantic query language, or semantic protocol. The query may be a relational database query and/or may include one or more relational database segments written to access a relational database. In response to receiving a query, the human expert interface (140) may forward the query to the query interface (105). The query interface (105) may then query the semantic graph (145) in order to obtain a result set. An example of a semantic query language is Simple Protocol and RDF Query Language (SPARQL). Thus, in one or more embodiments of the invention, the human expert interface (140) is configured to receive SPARQL queries from one or more expert users. The human expert interface (140) may be configured to display the result set or a portion of the result set to the user in response to the query. In one or more embodiments of the invention, the expert user may be a tax preparer, a certified public accountant, a tax counselor, an attorney, an individual taxpayer, or any other authorized person or entity.

In one or more embodiments of the invention, the tax preparation engine (100) includes functionality to create and maintain one or more user accounts. The tax preparation engine (100) may manage security credentials of one or more users of the accounts. Furthermore, the tax preparation engine (100) may limit access to one or more data sources (e.g., semantic graphs, tables, etc.) and/or may implement row-level or concept-level security by associating a user identifier of a user with various different types of data in the NoSQL database.

In one or more embodiments of the invention, the data mining engine (135) includes functionality to mine one or more tax documents to identify relevant tax data based on the tax preparation ontology. The data mining engine (135) may identify a predefined list of data repositories (e.g., websites, FTP addresses, and/or internet protocol (IP) addresses) and access the data repositories in order to identify and/or download tax documents into the noSQL database. The data mining engine (135) may be configured to scrape the tax data from the tax documents based on the tax preparation ontology. Thus, when mining the tax documents, the data mining engine (135) may: keyword match at least a portion of one or more concepts defined in the tax preparation ontology within the tax documents, identify subjects, properties, and/or relationships of the ontology within the tax documents, perform a textual search of the tax documents for one or more string values (e.g., a regular expression search string identifying one or more elements of the tax preparation ontology), scrape data from a web page or web application, perform optical character recognition (OCR) on one or more of the tax documents in order to make them readable, and or perform any necessary searching and/or processing of the tax documents in order to identify relevant tax data. Relevant tax data may include form names, deduction amounts, income limits, tax rates, required fields, selectable items, credits, income types, deduction categories, conditions for obtaining a tax credit/deduction, depreciation methods, business categories, and/or any data necessary or related to the filing of a financial return.

In one or more embodiments of the invention, the tax preparation engine (100) includes functionality to create one or more triples based on the relevant tax data. The triples may include data matched to programming constructs defined by the tax preparation ontology, and may be defined using any framework, protocol, or language for defining relationships among data (e.g., resource description framework (RDF), N-triples). Thus, in one example, the data mining engine (135) matches the IRS 1040A tax form to a "TaxForm" class defined in the tax preparation ontology. In this example, the tax preparation engine (100) creates the following triple: "IRS 1040A" isA "TaxForm". The following illustrates some additional examples of triples, in accordance with various embodiments of the invention:

@prefix p: <http://tt.intuit.com/person>.
@prefix c: <http://tt.intuit.com/company>.
@prefix d: <http://tt.intuit.com/data>.
@prefix r: <http://tt.intuit.com/rel>.
p:Gang_Wang r:works_for c:Intuit.
c:Intuit r:issues d:w2_1234.
d:w2_1234 r:belongs_to p:Gang_Wang.

In one or more embodiments of the invention, the tax preparation engine (100) includes functionality to construct the semantic graph (145) using the triples. The semantic graph (145) is a data structure storing or representing one or more triples which are, either directly or indirectly, connected through relationships between their various subjects, predicates, and/or objects. Constructing the semantic graph may involve creating a file, structure, and/or table in a predefined modeling language or protocol. For example, constructing the semantic graph may involve deserializing triples from an RDF/XML file and storing the triples in the noSQL database (120). In one or more embodiments of the invention, the tax preparation engine (100) is configured to construct multiple semantic graphs. When multiple semantic graphs are constructed, each graph may be directed towards a predefined tax topic or concept defined in an ontology. Any number of semantic graphs and/or tax preparation ontologies may be used, in accordance with various embodiments of the invention.

Figure 2:
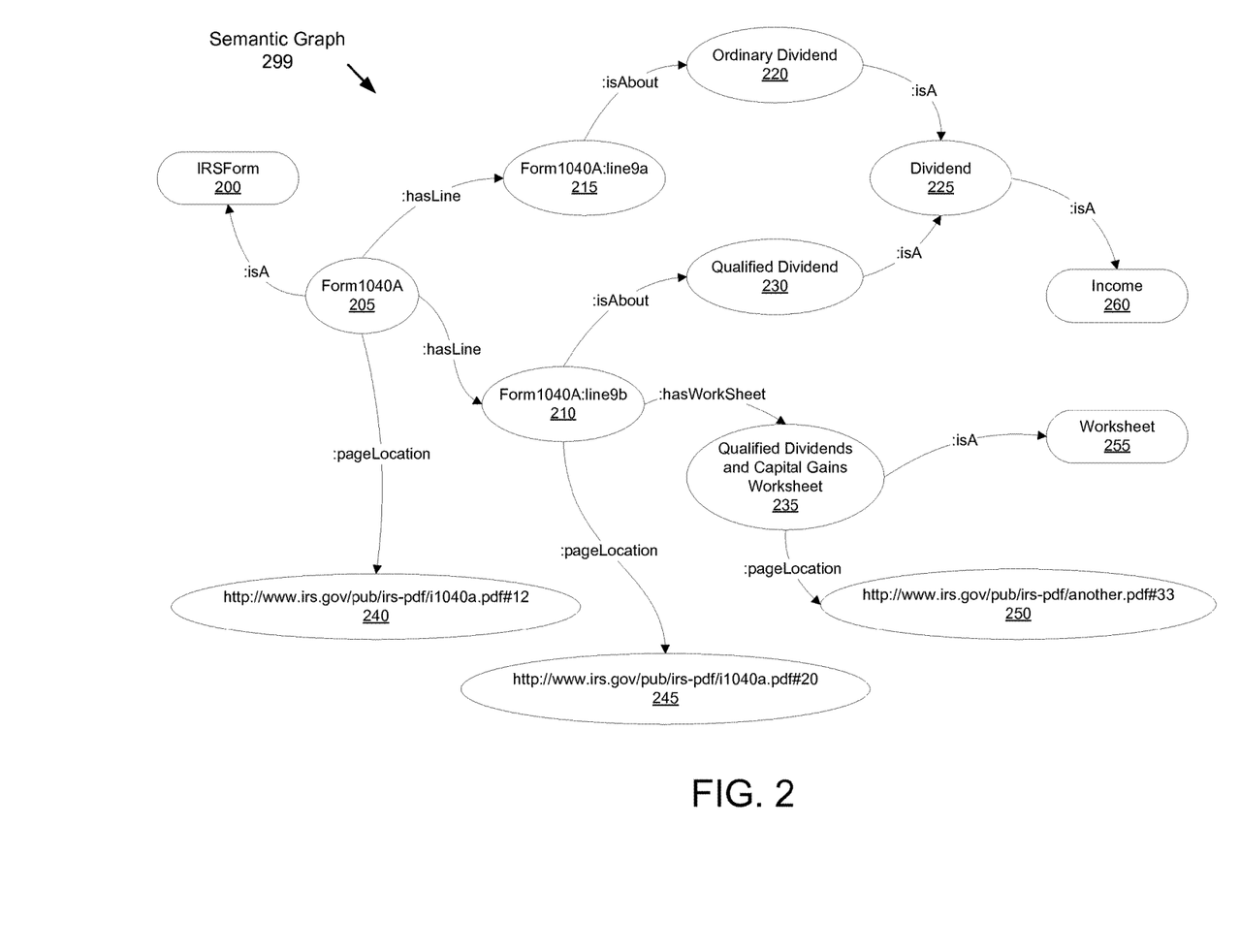
FIG. 2 shows an example illustration of a semantic graph in accordance with one or more embodiments of the invention.

FIG. 2 depicts an example illustration of a semantic graph (299) in accordance with one or more embodiments of the invention. In this example, the semantic graph (299) includes at least the following triples:

"IRSForm" (200) isA "Form1040A" (205)
"Form1040A" (205) hasLine "Form1040A:line9a" (215)
"Form1040A:line9a" (215) isAbout "Ordinary Dividend" (220)
"Ordinary Dividend" (220) isA "Dividend" (225)
"Dividend" (225) isA "Income" (260)
"Form1040A" (205) hasLine "Form1040A:line9b" (210)
"Form1040A:line9b" (210) isAbout "Qualified Dividend" (230)

"Qualified Dividend" (230) isA "Dividend" (225)
"Form1040A:line9b" (210) hasWorkSheet "Qualified Dividends and Capital Gains Worksheet" (235)
"Qualified Dividends and Capital Gains Worksheet" (235) isA "Worksheet" (255)
"Qualified Dividends and Capital Gains Worksheet" (235) pageLocation "http://www.irs.gov/pub/irs-pdf/another-.pdf#33" (250)
"Form1040A:line9b" (210) pageLocation "http://www.irs.gov/pub/irs-pdf/i1040a.pdf#20" (245)
"Form1040A" (205) pageLocation "http://www.irs.gov/pub/irs-pdf/i1040a.pdf#12" (240)

Returning to FIGS. 1A and 1B, in one or more embodiments of the invention, the query interface (105) includes functionality to receive a semantic query language query. The query interface (105) may be configured to receive queries from the inference engine (110), from the human expert interface (140), and/or from any other source or entity (e.g., an external software application), in accordance with various embodiments of the invention. The semantic language query may be any statement or set of statements requesting data from the semantic graph. For example, the semantic language query may be a SPARQL query entered into human expert interface (140) by a tax preparation expert. In this example, the human expert interface sends the query to the query interface (105) and receives a result set in response to the query. The human expert interface (140) then displays the result set to the tax preparation expert.

In one or more embodiments of the invention, the query interface (105) includes functionality to query the semantic graph using the semantic language query. The query interface (105) may be configured to obtain a result set in response to querying the semantic graph. In one or more embodiments of the invention, the query interface (105) includes functionality to send the result set or a portion of the result set to a third party software application and/or any predefined user or entity.

In one or more embodiments of the invention, the query interface (105) includes functionality to identify one or more predefined filters and/or security credentials. Thus, the query interface (105) may be configured to remove at least a portion of the result set or to modify the result set based on restrictions defined by the predefined filters and/or security credentials of a requesting entity.

In one or more embodiments of the invention, the tax preparation engine (100) includes functionality to return the result set to the tax preparation application (130). The tax preparation engine (100) may send the result set to the tax preparation application (130) over a network connection or using any message passing protocol (local or remote), in accordance with various embodiments of the invention.

In one or more embodiments of the invention, the tax preparation application (130) includes functionality to display at least a portion of the result set to a user in response to a help request. The tax preparation application (130) may display the results in a dialog box or may send the results to a user by email or some other messaging protocol, in accordance with various embodiments of the invention. In one or more embodiments of the invention, the tax preparation application (130) does not receive a help request. Rather, the tax preparation application (130) may be configured to detect that the user requires help by determining that one or more help thresholds is exceeded. A help threshold may be a period of inactivity, a number of help requests, and/or any other criteria for determining that the user may require help.

In one or more embodiments of the invention, the application programming interface (115) is specification exposed to external applications for accessing the tax knowledge model (125). The application programming interface (115) may be configured to provide one or more API classes and/or methods for accessing semantic data in the tax knowledge model (125). In one or more embodiments of the invention, an application such as the tax preparation application (130) instantiates a class using the application programming interface (115) and makes one or more API calls using methods provided by the application programming interface (115). The API calls may provide a mechanism for querying the tax knowledge model (125) and/or inferring semantic information from the tax knowledge model (125) based on one or more behaviors or actions of the user.

In one or more embodiments of the invention, the inference engine (110) includes functionality to receive an message from the application programming interface (115) and to construct one or more semantic language queries in response to the message. The message may be a request for data and/or may define one or more actions performed by the user. Furthermore, the message may include one or more attributes of the user obtained from the tax preparation application (130) or some other requesting entity. The inference engine may utilize the behavior and/or attribute data to construct queries in an effort to "infer" what the user requires (e.g., help in completing a tax form). In this way, the inference engine (110) operates as a chaining mechanism between the query interface (105) and the application programming interface (115), in accordance with various embodiments of the invention.

In one or more embodiments of the invention, the tax knowledge model (125) is a persistent data structure or set of data structures stored in the noSQL database (120). The tax knowledge model (125) may include the semantic graph (145), triples, temporary/intermediary results from execution of one or more queries, indexes or other internal representations of tax related data, security preferences/credentials/restrictions on tax related data, and/or metadata corresponding to the semantic graph or other data.

In one or more embodiments of the invention, the noSQL database (120) is a database or storage application residing on one or more servers. The noSQL database (120) may be any repository not using structured query language (SQL) and configured to store tax related data. The noSQL database (120) may include one or more key-value stores, BigTable implementations, document store databases, and/or graph databases. In one or more embodiments of the invention, the noSQL database (120) includes one or more tables in a distributed database management system (DBMS), a clustered database, a standalone flat file, and/or any storage software residing on one or more physical storage devices. Examples of a storage device may include, but are not limited to, a hard disk drive, a tape drive, a solid state drive, and/or other memory device. Any type of database or storage application can be used, in accordance with various embodiments of the invention.

In one or more embodiments of the invention, the noSQL database (120) is a separate application or series of applications residing on one or more servers external (and communicatively coupled) to the tax preparation engine (100). Alternatively, in one or more embodiments of the invention, the noSQL database (120) may be an integrated component of the tax preparation engine (100) or may reside, either partially or entirely, in one or more common hardware devices (e.g., a server).

Figure 3:
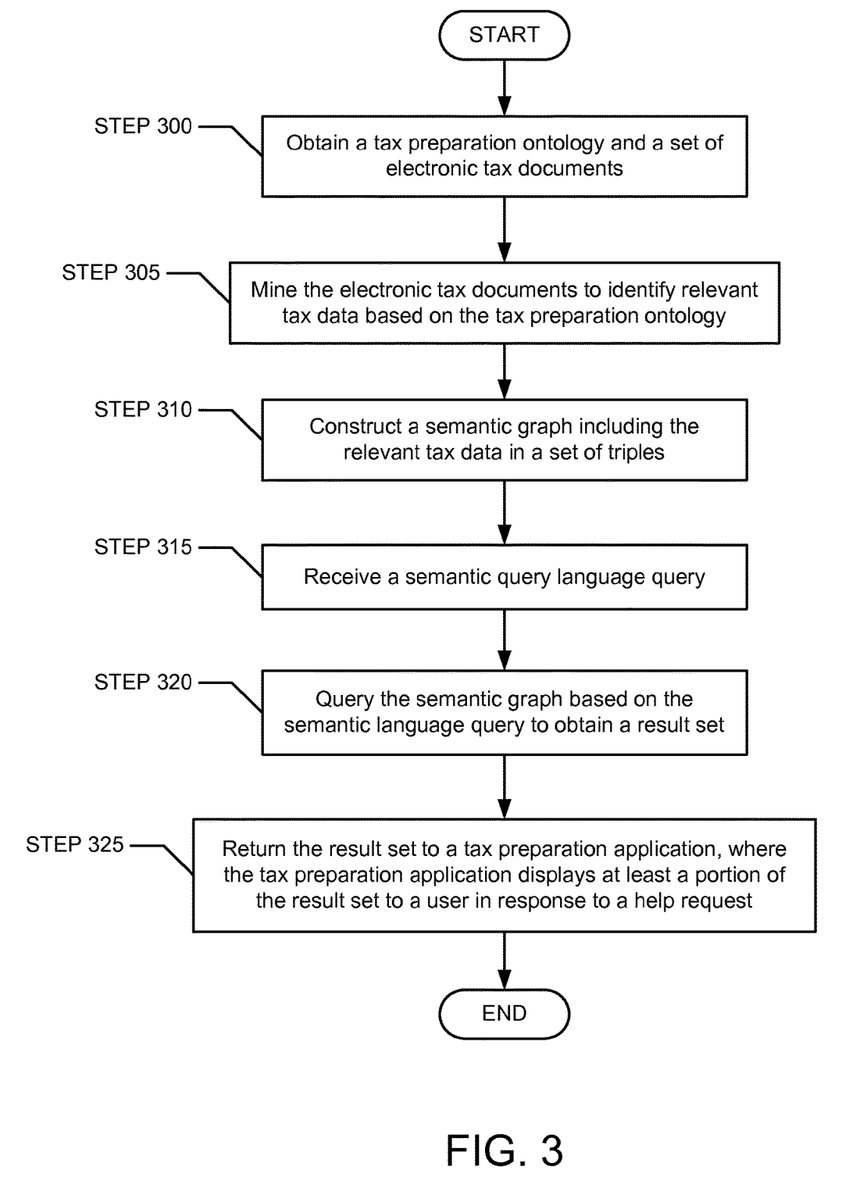
FIG. 3 shows a flowchart in accordance with one or more embodiments of the invention.

FIG. 3 shows a flowchart of a method for tax preparation. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, in one or more embodiments of the invention, a tax preparation ontology and a set of electronic tax documents is obtained. The tax preparation ontology may be identified within a storage repository (e.g., a database management system) communicatively connected to a tax preparation engine (e.g., tax preparation engine (100) of FIG. 1A, discussed above) and/or may be obtained from a third party entity. In one or more embodiments of the invention, the electronic tax documents are obtained from a server application of a government agency. Obtaining the electronic tax documents may involve scraping a website of a government agency. Examples of a government agency may include, but are not limited to, a county tax assessor, a city government, a state government, and/or a board of equalization.

In STEP 305, in one or more embodiments of the invention, the electronic tax documents are mined to identify relevant tax data based on the tax preparation ontology. Mining the electronic tax documents may involve scraping the electronic documents and/or performing a search using a matching string (e.g., a regular expression) or one or more matching terms. The search string may be matched to a subject and/or object of one or more triples in the tax preparation ontology. For example, the tax document "Form 1040A" may be mined in an electronic tax document and matched to the subject "Tax Form".

In STEP 310, in one or more embodiments of the invention, a semantic graph is constructed. The semantic graph may include the relevant tax data stored in a set of triples (see STEP 305, above). The semantic graph may include one or more nodes representing subjects and objects and one or more directed graph edges, with each edge representing a relationship between two nodes in the graph. The semantic graph may be any data structure at least defining the aforementioned components. Constructing the semantic graph may involve serializing the definition of the graph (e.g., written in a modeling language) into one or more files and/or storage locations.

In STEP 315, in one or more embodiments of the invention, a semantic query language query is received. The semantic language query may be received directly from a user or may be received from an inference engine (e.g., inference engine (110) of FIG. 1A, discussed above). The inference engine may be configured to construct the semantic language query in response to detecting one or more predefined actions of the user.

In STEP 320, in one or more embodiments of the invention, the semantic graph is queried based on the semantic language query to obtain a result set. The query may be executed according to the programming language in which it is written. The programming language may be any language including functionality to query a noSQL database.

In STEP 325, in one or more embodiments of the invention, the result set is returned to a tax preparation application. The tax preparation application may display at least a portion of the result set to a user in response to a help request or an inference that the user requires help.

The following section describes various examples of the invention. The examples are included to aid in the understanding of the invention but are not intended to limit the scope of the invention.

Figure 4:
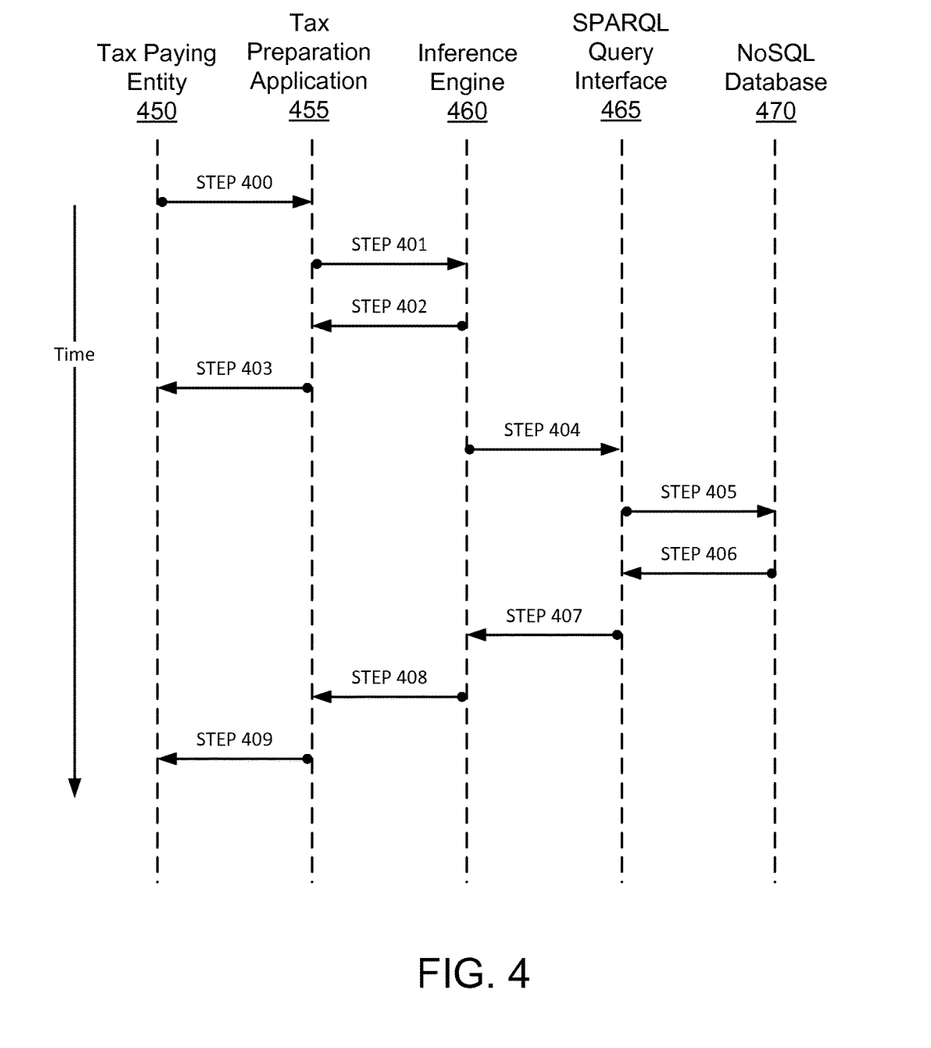
FIGS. 4 and 5 show example sequence diagrams in accordance with one or more embodiments of the invention.

FIG. 4 depicts an example of a sequence diagram in accordance with one or more embodiments of the invention. In this example, a tax preparation engine begins by importing a tax preparation ontology provided by a system designer. The tax preparation ontology is implemented in Web Ontology Language (OWL) and includes a hierarchical concept class structure defining objects, classes, and members of various different tax concepts.

Continuing the example, the tax preparation engine then accesses a public Internal Revenue Service database and downloads a set of electronic tax documents. The tax preparation engine begins to text mine the documents using the tax preparation ontology. Various keywords in the electronic tax documents are matched to subjects and objects of the ontology, and a set of triples are created from the matching. The tax preparation engine uses the triples to construct a semantic graph representing relationships between data mined from the electronic tax documents. Both the semantic graph and the tax preparation ontology are stored in a noSQL database (470) using resource description framework (RDF) descriptions.

Continuing the example, an expert user then logs into a human expert interface of the tax preparation engine and begins to refine and improve the semantic graph. Incorrect relationships are corrected or removed and triples are added and removed to correct for intended meaning that may have been missed during the automatic text mining and analysis process. In this example, the expert user differentiates between various instances of the word "child" to indicate that a child may refer to either (1) a human dependent or (2) a nested reference or document. Other terms which were interpreted to be different are combined. For example, various uses of the word "document" and "form" are combined when referring to the same tax concept (e.g., a tax form).

Continuing the example, the tax preparation engine resides on a server and is configured to receive requests from multiple clients using tax preparation applications. The tax preparation engine provides an application programming interface to the clients in order to facilitate the completion and filing of tax returns.

Continuing the example, a tax preparation application (455) initiates a session with a tax paying entity (450) who intends to complete his tax return (STEP 400). The tax paying entity (450) then opens the help section of the tax preparation application (455) and begins browsing various sections related to tax credits. This behavior information is automatically transmitted to an inference engine (460) of the tax preparation engine at periodic intervals (STEP 401, upon detecting that an Internet connection is available). The inference engine (460) determines, based on an analysis of the tax paying entity's (450) behavior, that the tax paying entity (450) may require help. The inference engine (460) sends a message to the tax preparation application (455) indicating that help is available (STEP 402). The tax preparation application (455) communicates this to the tax paying entity (450) (STEP 403).

Continuing the example, the inference engine (460) then creates a Simple Protocol and RDF Query Language (SPARQL) query based on the analysis of the tax paying entity's (450) behavior. The inference engine (460) sends the query to a SPARQL query interface (465) (STEP 404) which then executes the query on the noSQL database (470) (STEP 405). The noSQL database (470) returns a result set to the SPARQL query interface (465) (STEP 406) which then returns the result set to the inference engine (460) (STEP 407). The result set is then sent to the tax preparation application (455) (STEP 408) and at least a portion of the result set is displayed to the tax paying entity (STEP 409). In this example, the inference engine (460) determined, based on an indication that the tax paying entity had a child within the previous tax year and was browsing the "credit" section of the help dialog, that the tax paying entity required help in claiming the child tax credit. The result set included semantic data describing what the child tax credit is and whether or not the tax paying entity qualifies.

Figure 5:
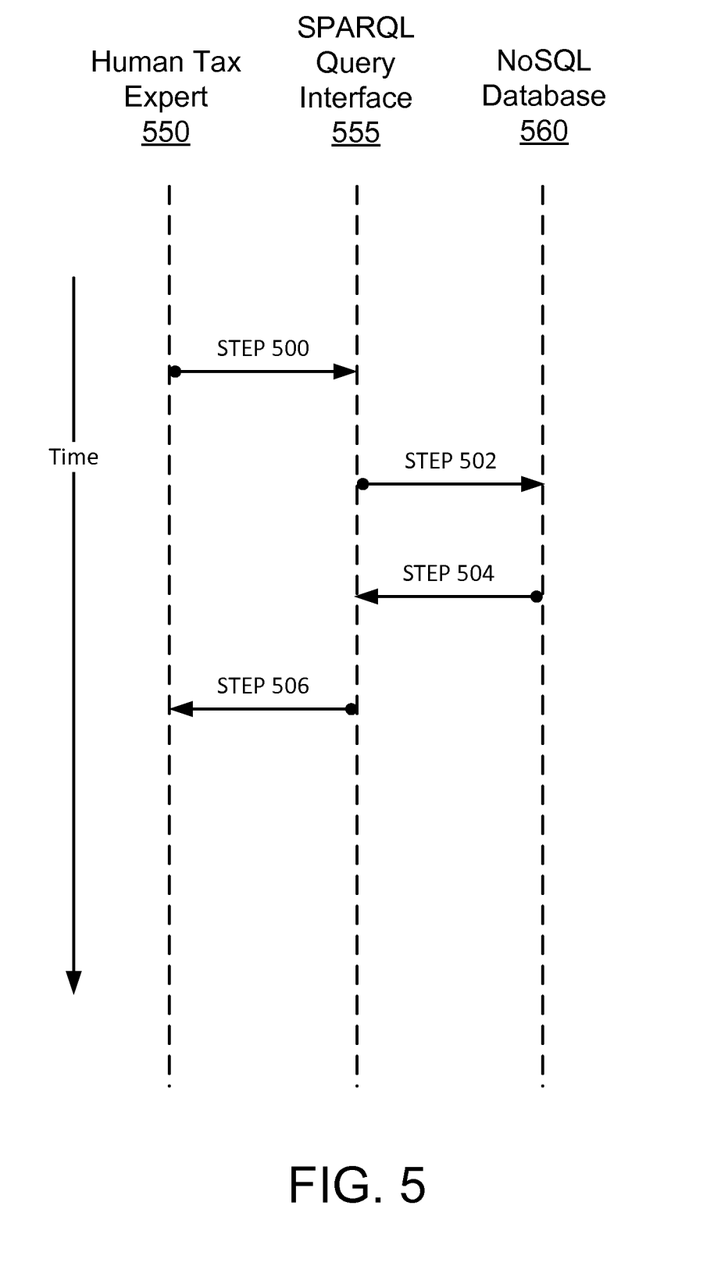

FIG. 5 depicts a second example of a sequence diagram in accordance with one or more embodiments of the invention. In this example, a human tax expert (550) preparing a tax return on behalf of a client is provided a SPARQL query interface (555) for searching the noSQL database (560). The SPARQL query interface (555) receives a SPARQL query (STEP 500) directly from the human tax expert (550) via a web dialog. The SPARQL query interface (555) then queries the noSQL database (560) (STEP 502 and 504) and outputs results to the human tax expert (550) in response (STEP 506).

Figure 6:
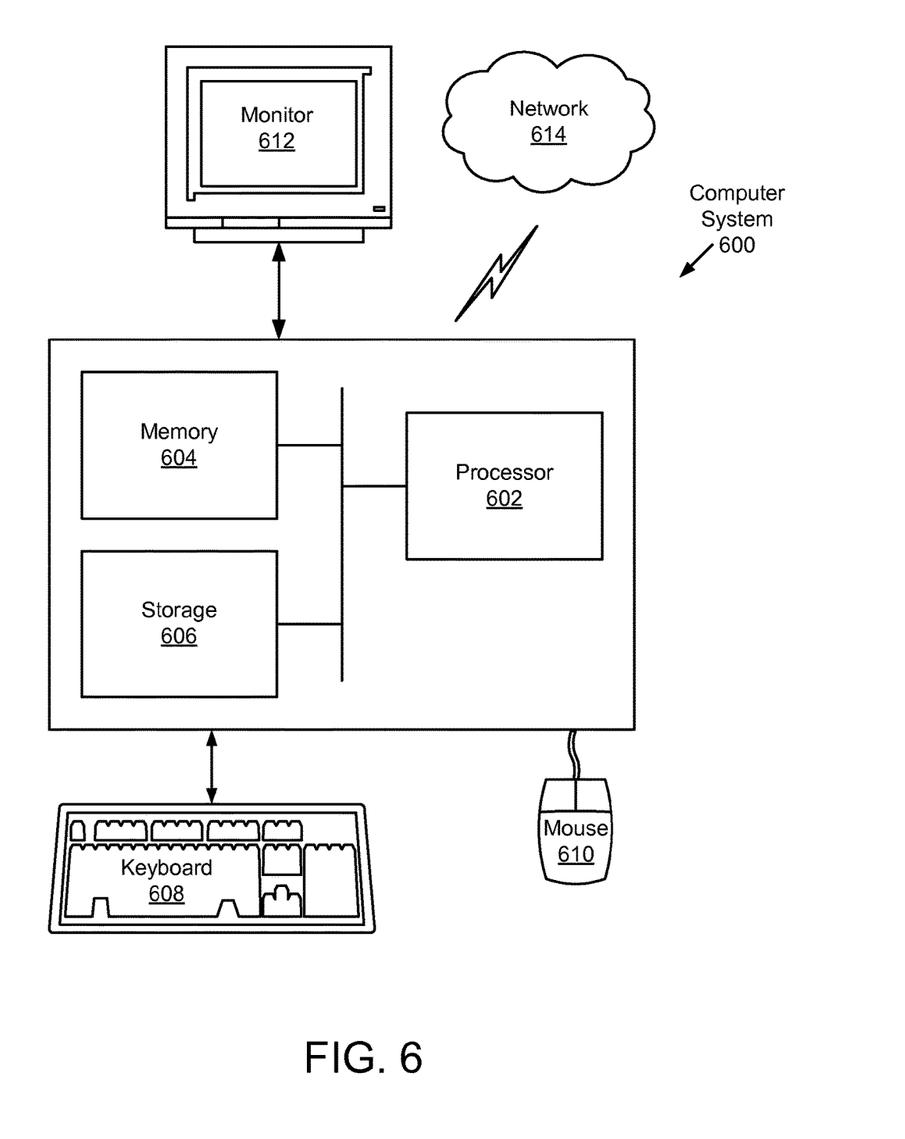
FIG. 6 shows a computer system in accordance with one or more embodiments of the invention.

Embodiments of the invention may be implemented on virtually any type of computer regardless of the platform being used. For example, as shown in FIG. 6, a computer system (600) includes one or more processor(s) (602) (such as a central processing unit (CPU), integrated circuit, hardware processor, etc.), associated memory (604) (e.g., RAM, cache memory, flash memory, etc.), a storage device (606) (e.g., a hard disk, an optical drive such as a compact disk drive or digital video disk (DVD) drive, a flash memory stick, etc.), and numerous other elements and functionalities typical of today's computers (not shown). The computer system (600) may also include input means, such as a keyboard (608), a mouse (610), or a microphone (not shown). Further, the computer system (600) may include output means, such as a monitor (612) (e.g., a liquid crystal display (LCD), a plasma display, or cathode ray tube (CRT) monitor). The computer system (600) may be connected to a network (614) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (600) includes at least the minimal processing, input, and/or output means necessary to practice embodiments of the invention.

Further, in one or more embodiments of the invention, one or more elements of the aforementioned computer system (600) may be located at a remote location and connected to the other elements over a network. Further, embodiments of the invention may be implemented on a distributed system having a plurality of nodes, where each portion of the invention (e.g., noSQL database (120), tax preparation application (100), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By aggregating data to create a tax knowledge model and a semantic graph, it may be possible to provide more relevant assistance and to streamline the preparation and filing of financial returns. Also, by analyzing user attributes and behaviors to query the semantic graph, it may be possible to provide customized and meaningful feedback and assistance to a tax paying entity during the preparation and filing of a financial return.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tax preparation, comprising:
   obtaining a tax preparation ontology and a plurality of electronic tax documents; mining, by a computer processor, the plurality of electronic tax documents to identify relevant tax data based on the tax preparation ontology; constructing, by the computer processor, a semantic graph comprising the relevant tax data in a plurality of triples;
   receiving, from a human expert interface, an improvement, made by a human tax expert, to the plurality of triples to obtain an expert improved semantic graph, wherein the improvement made by the human tax expert comprises:
   updating a relationship between a subject and an object of a first triple of the plurality of triples;
   adding a new triple to the plurality of triples; removing a second triple from the plurality of triples: and
   defining a properly corresponding to a tax concept; receiving a semantic query language query from a user preparing a tax return; querying the expert improved semantic graph based on the semantic language query to obtain a result set; and
   returning the result set to a tax preparation application, wherein the tax preparation application displays at least a portion of the result set to the user in response to a help request.

2. The method of claim 1, wherein constructing the semantic graph comprises:
   creating plurality of nodes representing at least a set of subjects and objects of the plurality of triples; and
   creating a plurality of directed edges connecting at least a subset of the plurality of nodes, wherein the plurality of directed edges represent relationships between the subjects and objects.

3. The method of claim 2, further comprising:
   obtaining a plurality of modifications to the expert improved semantic graph from the human tax expert; and
   updating the expert improved semantic graph based on the plurality of modifications.

4. The method of claim 1, further comprising:
   periodically polling a repository comprising the plurality of electronic tax documents;
   identifying a plurality of updated electronic tax documents in the repository;

mining the plurality of updated electronic tax documents to identify new relevant tax data based on the tax preparation ontology; and updating the expert improved semantic graph based on the new relevant tax data.

5. The method of claim 1, further comprising:

receiving, from the user, a selection of a help menu item in the tax preparation application; and generating an application programming interface (API) call comprising the help request, wherein the API call is used to construct the semantic query language query.

6. The method of claim 1, further comprising:

storing the expert improved semantic graph in a noSQL database.

7. The method of claim 1, wherein the semantic-language query is obtained from a tax expert, and wherein the tax preparation application prepares a financial return of the user.

8. The method of claim 1, wherein the semantic language query is a SPARQL Protocol and RDF Query Language query.

9. The method of claim 1, wherein the plurality of triples are Resource Description Framework (RDF) triples.

10. The method of claim 1, wherein the semantic graph is a data structure created by a plurality of statements in a modeling framework.

11. A system for tax preparation, comprising:

a computer processor; a noSQL database comprising:

a semantic graph comprising relevant tax data in a plurality of triples; a tax preparation engine executing on the computer processor and configured to:

obtain a tax preparation ontology and a plurality of electronic tax documents; mine the plurality of electronic tax documents to identify the relevant tax data based on the tax preparation ontology;

construct the semantic graph and store the semantic graph in the noSQL database; a human expert interface configured to:

receive an improvement, made by a human tax expert, to the plurality of triples to obtain an expert improved semantic graph, wherein the improvement made by the human tax expert comprises:

updating a relationship between a subject and an object of a first triple of the plurality of triples;

adding a new triple to the plurality of triples; removing a second triple from the plurality of triples; and defining a property corresponding to a tax concept; and a query interface configured to:

receive a semantic query language query from a user preparing a tax return; query the expert improved semantic graph based on the semantic language query to obtain a result set; and return the result set to a tax preparation application, wherein the tax preparation application displays at least a portion of the result set to the user in response to a help request.

12. The system of claim 11, wherein constructing the semantic graph comprises:

creating plurality of nodes representing at least a set of subjects and objects of the plurality of triples; and creating a plurality of directed edges connecting at least a subset of the plurality of nodes, wherein the plurality of directed edges represent relationships between the subjects and objects.

13. The system of claim 12, wherein the tax preparation engine is further configured to:

obtain a plurality of modifications to the expert improved semantic graph from the human tax expert; and update the expert improved semantic graph based on the plurality of modifications.

14. The system of claim 11, wherein the tax preparation engine is further configured to:

periodically poll a repository comprising the plurality of electronic tax documents;

identify a plurality of updated electronic tax documents in the repository;

mine the plurality of updated electronic tax documents to identify new relevant tax data based on the tax preparation ontology; and update the expert improved semantic graph based on the new relevant tax data.

15. The system of claim 11, further comprising:

The tax preparation application

Receiving, from the user, a selection of a help menu item displayed in a window of the tax preparation application; and generating, an application programming interface (API) call comprising the help request, wherein the API call is used to construct the semantic query language query.

16. The system of claim 11, wherein the semantic language query is obtained from a tax-expert, and wherein the tax preparation application prepares a financial return of the user.

17. The system of claim 11, wherein the semantic language query is a SPARQL Protocol and RDF Query Language query.

18. The system of claim 11, wherein the plurality of triples are Resource Description Framework (RDF) triples.

19. The system of claim 11, wherein the semantic graph is a data structure created by a plurality of statements in a modeling framework.

20. A non-transitory computer-readable storage medium comprising a plurality of instructions for tax preparation, the plurality of instructions comprising functionality to:

obtain a tax preparation ontology and a plurality of electronic tax documents; mine the plurality of electronic tax documents to identify relevant tax data based on the tax preparation ontology;

construct a semantic graph comprising the relevant tax data in a plurality of triples; receive, from a human expert interface, an improvement, made by a human tax expert, to the plurality of triples to obtain an expert improved semantic graph, wherein the improvement made by the human tax expert comprises:

updating a relationship between a subject and an object of a first triple of the plurality of triples;

adding a new triple to the plurality of triples; removing a second triple from the plurality of triples; and defining a property corresponding to a tax concept; receive a semantic query language query from a user preparing a tax return; query the expert improved semantic graph based on the semantic language query to obtain a result set; and return the result set to a tax preparation application, wherein the tax preparation application displays at least a portion of the result set to the user in response to a help request.

21. The non-transitory computer-readable storage medium of claim 20, wherein constructing the semantic graph comprises:

creating plurality of nodes representing at least a set of subjects and objects of the plurality of triples; and creating a plurality of directed edges connecting at least a subset of the plurality of nodes, wherein the plurality of directed edges represent relationships between the subjects and objects.

22. The non-transitory computer-readable storage medium of claim 21, wherein the plurality of instructions further comprise functionality to:
   obtain a plurality of modifications to the expert improved semantic graph from the human tax expert; and
   update the expert improved semantic graph based on the plurality of modifications.

23. The non-transitory computer-readable storage medium of claim 20, wherein the plurality of instructions further comprise functionality to:
   periodically poll a repository comprising the plurality of electronic tax documents; identify a plurality of updated electronic tax documents in the repository; mine the plurality of updated electronic tax documents to identify new relevant tax data based on the tax preparation ontology;
   and update the expert improved semantic graph based on the new relevant tax data.

24. The non-transitory computer-readable storage medium of claim 20, wherein the plurality of instructions further comprise functionality to:
   receive, from the user, a selection of a help menu item in the tax preparation application; and
   generate an application programming interface (API) call comprising the help request, wherein the API call is used to construct the semantic query language query.

25. The non-transitory computer-readable storage medium of claim 20, wherein the plurality of instructions further comprise functionality to:
   store the expert improved semantic graph in a noSQL database.

26. The non-transitory computer-readable storage medium of claim 20, wherein the semantic language query is obtained from a tax expert, and wherein the tax preparation application prepares a financial return of the user.

27. The non-transitory computer-readable storage medium of claim 20, wherein the semantic language query is a SPARQL Protocol and RDF Query Language query.

28. The non-transitory computer-readable storage medium of claim 20, wherein the plurality of triples are Resource Description Framework (RDF) triples.

29. The non-transitory computer-readable storage medium of claim 20, wherein the semantic graph is a data structure created by a plurality of statements in a modeling framework.

* * * * *